US006768789B1

(12) United States Patent
Wilk

(10) Patent No.: US 6,768,789 B1
(45) Date of Patent: Jul. 27, 2004

(54) METHOD AND SYSTEM FOR CALL ANSWERING

(75) Inventor: Daniel Wilk, Toronto (CA)

(73) Assignee: SOMA Networks, Inc., San Francisco, CA (US)

(*) Notice: Subject to any disclaimer, the term of this patent is extended or adjusted under 35 U.S.C. 154(b) by 0 days.

(21) Appl. No.: 09/717,210

(22) Filed: Nov. 22, 2000

(30) Foreign Application Priority Data

Jul. 7, 2000 (CA) .............................................. 2313974

(51) Int. Cl.$^7$ ............................ H04M 1/64; H04M 3/42
(52) U.S. Cl. ................ 379/67.1; 379/88.11; 379/88.12; 379/88.19; 379/201.07; 379/207.12; 379/211.02
(58) Field of Search ............................ 379/671, 69, 71, 379/76, 88.04, 88.11, 88.12, 88.14, 88.15, 88.16, 88.19, 88.2, 88.21, 201.06, 201.07, 201.08, 201.1, 207.12, 211.02, 212.01

(56) References Cited

U.S. PATENT DOCUMENTS

| | | | | |
|---|---|---|---|---|
| 4,481,382 A | * | 11/1984 | Villa-Real | 455/556 |
| 5,327,486 A | * | 7/1994 | Wolff et al. | 379/96 |
| 5,652,789 A | * | 7/1997 | Miner et al. | 379/201 |
| 5,742,905 A | * | 4/1998 | Pepe et al. | 455/461 |
| 5,752,191 A | * | 5/1998 | Fuller et al. | 455/445 |
| 5,754,627 A | * | 5/1998 | Butler et al. | 379/63 |
| 5,809,128 A | | 9/1998 | McMullin | 379/215 |
| 5,946,386 A | * | 8/1999 | Rogers et al. | 379/265 |
| 6,018,671 A | * | 1/2000 | Bremer | 455/567 |
| 6,243,374 B1 | * | 6/2001 | White et al. | 370/352 |
| 6,307,929 B1 | * | 10/2001 | Baylor et al. | 379/211.02 |
| 6,405,060 B1 | * | 6/2002 | Schroeder et al. | 455/566 |

OTHER PUBLICATIONS

"Managing communication on the road", Financial Post, Jul. 4, 2000, Donalee Moulton.
"Internet Users Across North America Rest Easy—For the First Time, You Can Answer Calls While On Line", InfoInterActive Inc.—Press Releases.
"Manual for Nokia 6190 Mobile Handset", Owner's Manual, Sep., 1999, pp. 1–108.

* cited by examiner

Primary Examiner—Allan Hoosain
(74) Attorney, Agent, or Firm—Katten Muchin Zavis Rosenman

(57) ABSTRACT

The present invention provides a novel system, method and apparatus for answering a telephone call. In one aspect of the invention, there is provided a system for call answering that includes a switch for connecting a telephony device to incoming calls received from callers connected to the switch via a telephone network. The switch is also connected to a processing unit and a storage device that contains a plurality of pre-recorded messages. When a callee at the telephony device receives an incoming call during a meeting (or at some other inconvenient time) and yet the callee wishes to respond to the caller, then the callee can provide (via a keypad on the telephony device) message selection criteria to the processing unit. The processing unit can then assemble an outgoing message based on the message selection critiera. The message is assembled from from the plurality of messages saved on the storage device. Having assembled the message, the processing unit can then play that outgoing message to the caller. In this manner, the callee is afforded a way to discretely respond to the caller without having to interrupt the meeting (or other activity that makes it inconvenient for the callee to answer the call.)

34 Claims, 2 Drawing Sheets

METHOD AND SYSTEM FOR CALL ANSWERING

FIELD OF THE INVENTION

The present invention relates to a system, apparatus and method of providing enhanced features in a telecommunications system. More specifically, the present invention relates to a method and system for answering telephone calls.

BACKGROUND OF THE INVENTION

Telephone networks are increasing in sophistication, and now offer a range of enhanced calling features to subscribers. Such calling features include voice mail, call forwarding, call waiting and Caller ID, and can help a subscriber to manage incoming telephone calls. For example, Caller ID allows a subscriber to screen incoming calls.

At its most simple, Caller ID allows the person receiving a call (the callee) to identify the caller and then choose whether to answer the call based on caller's identity. For example, during a meeting, a callee with Caller ID service may leave his wireless phone 'on'. If the callee should receive a call during the meeting, the identity of the incoming caller will be displayed on the callee's phone display. If the call is urgent, the callee may elect to leave the meeting and accept the call.

Alternatively, the callee may elect to ignore the call, perhaps muting the ringer of the telephone, and/or direct the incoming call to the callee's voicemail.

Many mobile telephones also include a silent ringer which can signal an incoming call, typically by vibrating the handset, without making an noise. Thus, it is possible to receive a telephone call in circumstances wherein it is otherwise socially inappropriate to answer a call, such as during the showing of a movie at a movie theatre. In such an event, the user can allow the call to be forwarded to voice mail, for subsequent follow-up, or, if the mobile telephone includes Caller ID features, the user can note the telephone number and move to another location wherein it is socially acceptable to return the call.

As is apparent, the callee's choices in these situations are limited. Thus, the callee can face the dilemma of being unable to answer a call, yet needing to do more than ignore the call or direct it to voice mail which current calling features do not permit. There are many other situations in which a callee may desire, or require, the ability of answering or otherwise responding to an incoming call without having to interrupt an ongoing activity or merely sending the call to voicemail.

One situation addressed by the prior art is where the callee is engaged in a dial-up internet connection over a PSTN telephone line. It is well known that during such a dial-up connection, the callee may receive one or more telephone calls from a caller over that PSTN telephone line. A caller in this situation is typically faced with busy signals or voice mail—however, the callee may be unaware that there is an urgent incoming call. In order to address this situation, U.S. Pat. No. 5,809,128 teaches a method and apparatus for permitting notification and control of blocked incoming calls over a data network. Blocked incoming calls over the PSTN are redirected to a subscriber proxy, which keeps track of an internet terminal being used by the callee, and sends a message to the callee at that internet terminal. The callee can then interact with the caller via the internet terminal to, for example, redirect the incoming call to the callee's cell phone, or redirect the incoming call the callee's voicemail. In any event, the callee is notified that the caller is attempting to reach the callee. However, U.S. Pat. No. 5,809,128 is limited to situations where the callee is already in a telephone call (i.e. an incoming call from the caller is blocked) and where the callee is proximal to an internet terminal.

Overall, it can be seen that the prior art is insufficient to allow a callee to manage incoming calls in certain situations.

SUMMARY OF THE INVENTION

It is an object of the present invention to provide a novel system, apparatus and method for call answering that obviates or mitigates at least one of the above-identified disadvantages of the prior art.

According to one aspect of the present invention, there is provided an apparatus for answering a telephone call comprising: a switching device for connecting to an incoming telephone call from a caller; a storage device for storing a plurality of predefined outgoing messages; a telephony-interface device operable to receive message selection criteria from a callee; and a processing unit connected to each of the devices, the processing unit operable to assemble an outgoing message based on the criteria. The processing unit is further operable to output the selected message to the caller via the switching device.

The present invention provides a novel system, method and apparatus for answering a telephone call. In an aspect of the invention, there is provided a system for call answering that includes a switch for connecting a telephony device to incoming calls received from callers connected to the switch via a telephone network. The switch is also connected to a processing unit and a storage device that contains a plurality of pre-recorded messages. When a callee at the telephony device receives an incoming call during a meeting (or at some other inconvenient time) and yet the callee wishes to respond to the caller, then the callee can provide (via a keypad on the telephony device) message selection criteria to the processing unit. The processing unit can then assemble an outgoing message based on the message selection critiera. The message is assembled from the plurality of messages saved on the storage device. Having assembled the message, the processing unit can then play that outgoing message to the caller. In this manner, the callee is afforded a way to discretely respond to the caller without having to interrupt the meeting (or other activity that makes it inconvenient for the callee to answer the call.)

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
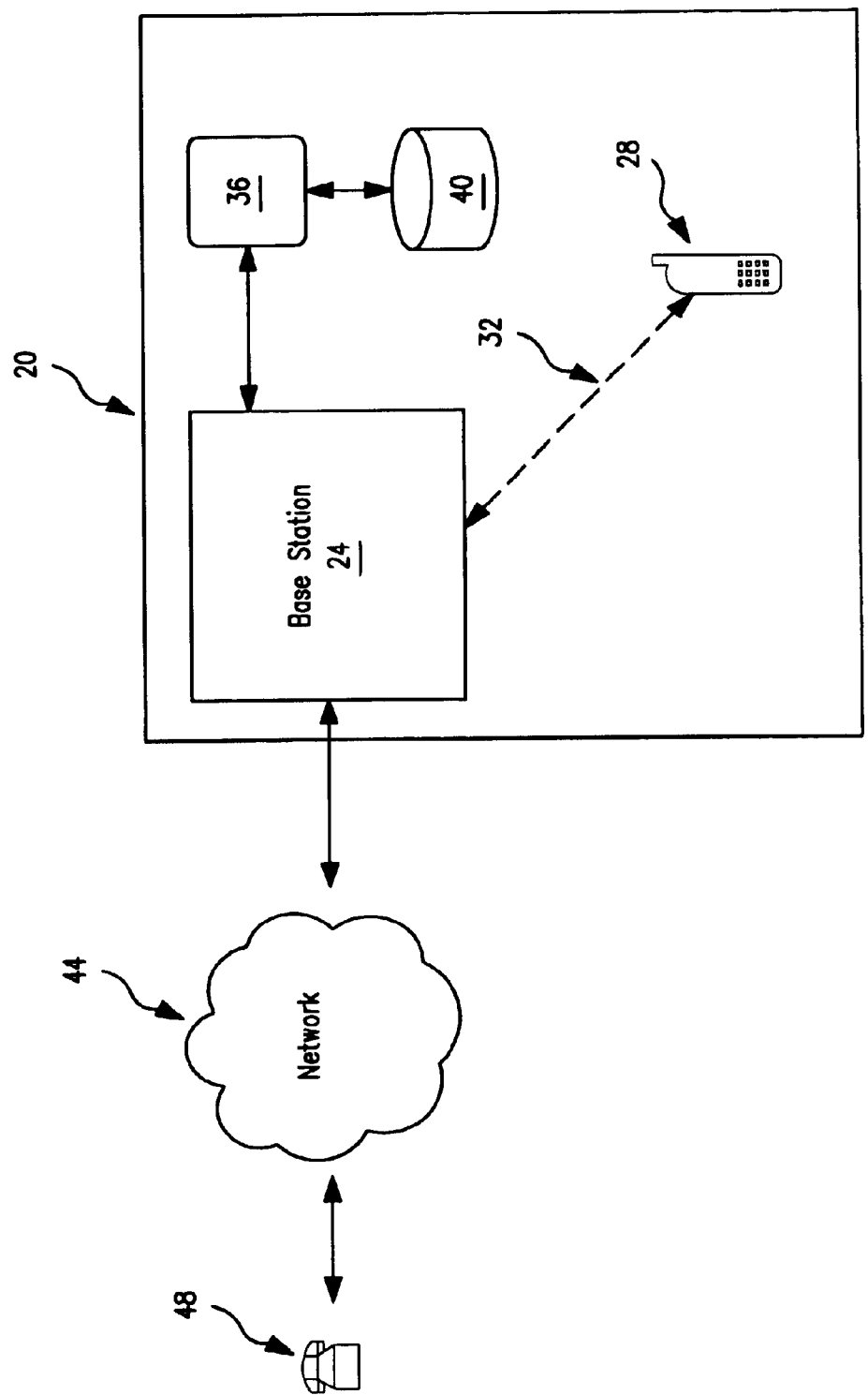
FIG. 1 is a schematic representation of a system for call answering in accordance with another embodiment of the invention; and, FIG. 2 is a flow-chart of a method for call answering in accordance with another embodiment of the invention.

Referring now to FIG. 1, a system for call answering is indicated generally at 20. System 20 includes a switch, which in a present embodiment is a wireless base station 24. Base station 24 is operable to manage telephone calls to and from a telephony-interface device, which in a present embodiment is a wireless telephone 28. Telephone 28 communicates with base station 24 via a wireless link 32, which can be based on any wireless protocol such as TDMA, FDMA, CDMA, GSM and the like. While the following discussion primarily concerns wireless (mobile) telephony devices, it will be understood that, in general, any type of switch, telephony-interface device and link can be used, such as an SS7 switch connected via a twisted-pair wired link to a plain-old-system-system (POTS) telephone or a rich-featured telephone with a central processing unit, display device and memory. (As used herein, the term rich-featured telephone is intended to comprise a telephony device which, at a minimum, includes a dial keypad, handset or equivalent and a display capable of displaying alpha numeric sequences, such as Caller ID and/or configuration information.)

Base station 24 is also connected to a processing unit 36 and a storage device 40. Processing unit 36 can be any known type of computing device, such as a SPARC server, and storage device 40 can be any known type of storage, such as a redundant array of independent discs (RAID). Processing unit 36 and storage device 40 can be located anywhere within system 20 in relation to telephone 28 and base station 24. For example, processing unit 36 and storage device 40 can be located at a base station controller connected to a plurality of base stations 24. Alternatively, processing unit 36 and storage device 40 can be implemented in a distributed manner across an entire network of computers. It is also contemplated that, where sufficient processing power and memory permits, processing unit 36 and storage device 40 can be integrated directly into, or otherwise local to, wireless telephone 28. Other implementations and locations for processing unit 36 and storage device 40 will occur to those of skill in the art.

Storage device 40 is operable to store a plurality of outgoing messages. These outgoing messages are associated with telephone 28, and can be predefined by the service provider of base station 24, or can be defined by the subscriber of telephone 28 using a configuration interface offered by the service provider. One suitable configuration interface is an interactive-voice-response (IVR) configuration system used to create outgoing messages in existing voicemail systems. However, other types of configuration systems can be used, as will occur to those of skill in the art. Such a configuration interface can be resident on processing unit 36 and accessible, as desired by the subscriber, from telephone 28 via base station 24, or any other telephony device that can connect to processing unit 36.

Processing unit 36 is operable to assemble, according to message selection criteria provided by the callee, an outgoing message that uses at least one of the messages saved on storage device 40. Processing unit 36 is further operable to output the assembled outgoing message to a caller via base station 24.

System 20 is also connected a telephone network 44, which in turn is connected to a caller telephone 48. In a present embodiment, caller telephone 48 is a plain-old-system-system (POTS) telephone and network 44 is the public-switched-network-network (PSTN). It will thus be apparent that network 44 includes a switch that is the connection-point for telephone 48, and that the switch manages, in cooperation with other switches in network 44, calls to and from caller telephone 48. It is to be understood that caller telephone 48 could also be a wireless telephone or rich-featured telephone, and that in general, caller telephone 48 is any type of voice terminal that allows a caller to make telephone calls over network 44. It will now be apparent that base station 24 is operable to process an incoming telephone call from caller telephone 48, and to direct that incoming call to a callee at wireless telephone 28.

Figure 2:
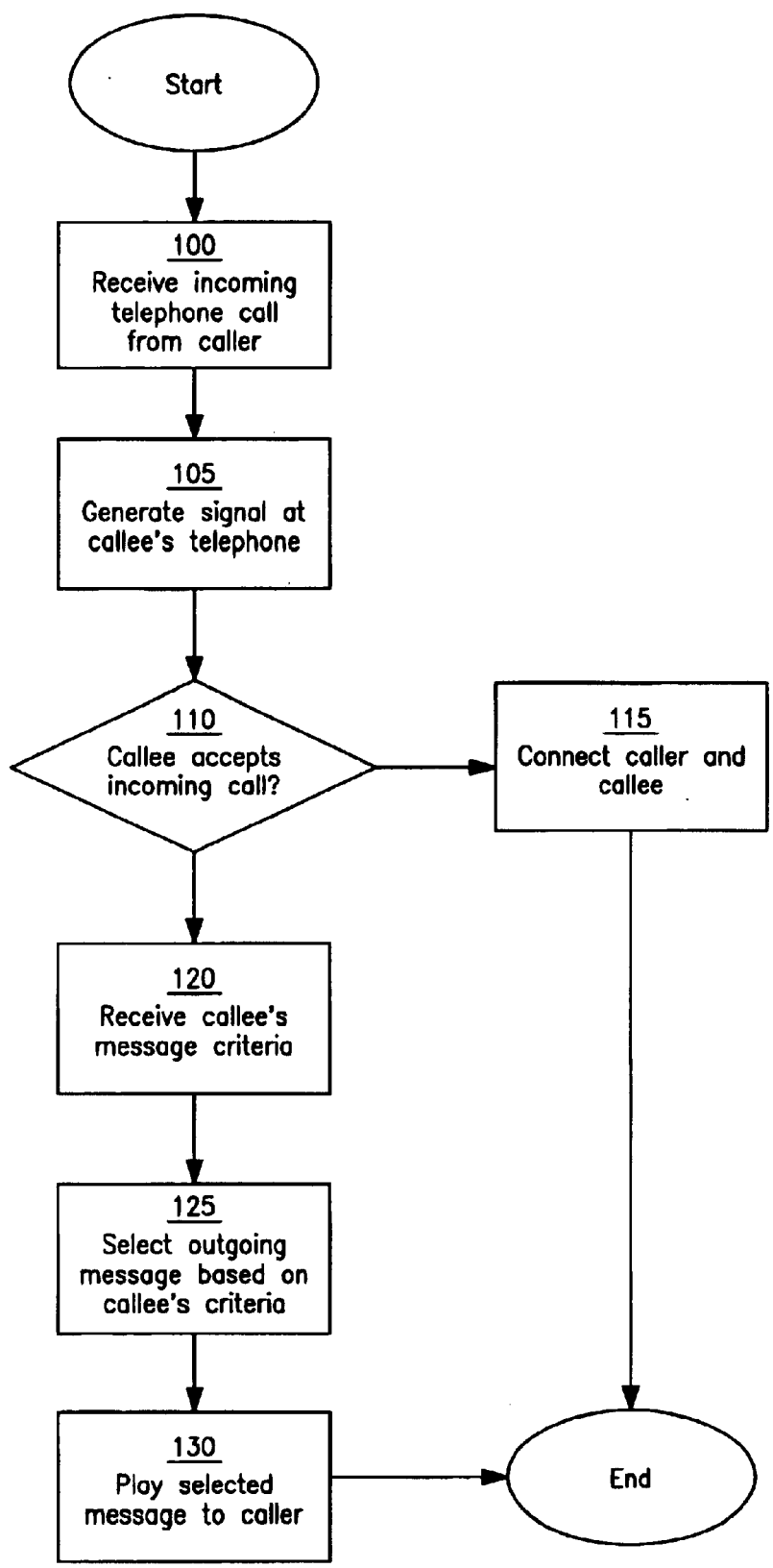

A method for call answering in accordance with the present invention will now be discussed with reference to the flow-chart shown in FIG. 2. In order to assist in the explanation of the method, reference will be made to the foregoing discussion of system 20 and FIG. 1.

In order to further assist in the explanation of the method, it will be assumed that the callee at wireless telephone 28 is about to enter a meeting. The callee expects that either his stock broker, 'Bill', or his wife 'Susan' may try to call him while he is in the meeting. The callee has also considered that an unexpected caller may attempt to call while the callee in the meeting. Accordingly, at a suitable time before entering the meeting, the callee prerecords the following three messages and saves them on storage device 40:

1. "I'm sorry, but I am in a meeting and can't get your call right now. I will call you back in about" X "minutes."
2. "Hi Susan, I'm in an important meeting at the moment. I should be finished in about" X "minutes."
3. "Hi Bill, I'm in a meeting. I'll call you in about" X "minutes."

The first message is intended to be directed to unknown callers, while the second and third messages are directed to the callee's wife, Susan, and the callee's stock broker, Bill, respectively. As should be apparent to those of skill in the art, various additional messages can have been predefined by the callee as desired.

When composing these messages, the callee defines space for the argument 'X' by, for example, pressing the zero key on the telephone dialing keypad at the appropriate point while recording each of the three messages. It is contemplated that most messages will have a single argument or parameter for which a user can provide input, but messages can also be defined with two or more parameters (Y, Z, etc.) if desired and the callee defines the space for each parameter when defining the message.

As will be seen from the discussion below, the value of 'X' (and Y and Z, etc.) will be entered, dynamically, on the keypad (or other user-input device) of wireless telephone 28 when a telephone call is received during the meeting, to indicate an appropriate value (e.g. ten) for the parameter, such as the amount of time the callee expects to elapse before the meeting ends or he can otherwise return the call or a different telephone number for the caller to call (e.g. "Hi Bill, I'm in a meeting. I'll call you in about ten minutes.") Appropriate values for a a parameter X can include telephone numbers (e.g. "Hi, unfortunately I an unavoidably occupied right now. Please dial X to reach one of my colleagues who can help you) or other information.

The value for parameter X can be entered directly from the keypad, i.e.—press the 1 key and then the '0' key, followed by a predefined delimiter key, such as the # key, which indicates that the input is finished, to input the value 10. The value for a parameter X can also be predefined by the callee and selected according to a set of prompts, also predefined by the callee, and displayed or otherwise indicated by telephone 28, i.e.—a set of prompts such as "press 1 for Microsoft, press 2 for Cisco, press 3 for Intel" can be displayed or a set of similar voice prompts can be provided at the earpiece of telephone 28.

By predefining appropriate values for parameters, sophisticated messages can be assembled, i.e. "Hi Bill, I'm tied up in a meeting. Please X my Y shares and I'll call you back in Z minutes to confirm," where X has predefined values of "buy" and "sell" associated with it, Y has predefined values of Microsoft, Cisco and Intel associated with it and Z accepts a numeric input from the keyboard, as before.

In the example mentioned above, the callee enters the meeting and during the meeting, the callee's wife, Susan, attempts to call the callee. Referring now to FIG. 2, a method in accordance with a presently preferred embodiment of the invention begins at step 100. The caller, Susan, places a call from caller telephone 48 and dials the number of the callee's wireless telephone 28. At step 100, this incoming call is received by base station 24. In addition, base station 24 receives the Caller ID information for caller telephone 48. Base station 24 then notifies wireless telephone 28 that there is an incoming call, and sends the Caller ID information received from caller telephone 48.

At step 105, a signal is generated at the callee telephone. Once wireless telephone 28 receives the notification of the incoming call, wireless telephone 28 rings and/or flashes the display and/or vibrates according the callee's preferences to notify the callee of the incoming call. At the same time, the Caller ID information is displayed on the display of wireless telephone 28.

The method then advances to step 110 where it is determined whether the callee wishes to accept the incoming call. If the callee provides user-input to wireless telephone 28 indicating that he wishes to accept the call, (i.e. presses the "TALK" key) then the method advances to step 115 and wireless telephone 28 is connected to caller telephone 48 in the usual manner.

Alternatively, if at step 110 the callee provides user-input to wireless telephone 28 indicating that he wishes to reject the call, then an interactive menu is offered to the callee, allowing the callee to select one of the predefined messages saved in storage device 40, and to provide input for the arguments defined for the message.

At step 120, the callee's message selection and parameter criteria is received. Continuing with the present example, it will be assumed that the callee sees, from reading the Caller ID displayed on wireless telephone 28, that it is his wife, Susan, who is calling. Accordingly, the message criteria received from the callee can be the selection of the second message saved on storage device 40, and entry of the number fifteen to complete argument 'X', where fifteen is the number of minutes that the callee expects to elapse before the meeting ends. The actual keys pressed by the callee can therefore be "2#15#", where the # key is used as an input delimiter.

The method then advances to step 125, at which point the criteria received at step 125 is passed, via wireless base station 24 to processing unit 36. Processing unit 36 reviews the selection and selects the second message saved on storage device 40, and substitutes the word 'fifteen', (i.e. from a previously stored vocabulary of audio messages or from a text to speech engine at processor 36) for the argument 'X' within the second message.

The method then advances to step 130 where the message selected at step 125 is played to the caller (Susan) at caller telephone 48. Accordingly, the message: "Hi Susan—I'm in an important meeting at the moment. I should be finished in about fifteen minutes" is sent from processing unit 36 and outputted to caller telephone 48.

In a present embodiment, the incoming call and method then terminates. However, it is contemplated that a variety of other options could be offered at this point. For example, after the message has completed, the caller at caller telephone 48 can be provided with the option to leave a message in a voicemail box designated by the callee, or offered the opportunity to provide a text message (for example, using the SMS protocol) that will appear on the display of wireless telephone 28, if telephone 28 is capable of such a service.

While the foregoing method discusses the embodiment in relation to answering a call in a meeting, it will be understood that the present invention is applicable to answering a call during any inconvenient time, such as during a meal, during a movie, or when the callee currently in a telephone call. Other inconvenient times that a callee may wish to discretely answer a telephone call will occur to those of skill in the art.

It is also contemplated that further functionality can be added to wireless telephone 28 whereby, for example, telephone 28 stores the caller's number, and the value given for the arguments 'X', 'Y', 'Z', etc. In this manner, the callee has a record of what message was given to a caller. Also, if an argument represented a time, telephone 28 can remind the callee to respond to the caller within the time period specified by the argument.

While the embodiments discussed herein are directed to specific implementations of the invention, it will be understood that combinations, sub-sets and variations of the embodiments are within the scope of the invention. For example, the present invention can be implemented on a callee telephone that does not have a display unit—i.e. when the phone rings, the callee can simply select, from the callee's own memory, one of a plurality outgoing messages by pressing a key corresponding to the selected outgoing message.

It is also contemplated that a message can be preassociated with a given caller prior to entering the meeting (or other occasion where a callee requires privacy from incoming telephone calls), so that the callee need not even be notified or interrupted during the meeting. For example, prior to entering the meeting, system 20 can be modified so that the callee can associate the second message with his wife, Susan, such that when Susan phones, system 20 automatically plays the second message to Susan when she calls, without even notifying the callee.

The present invention can be applied to POTS telephone systems, which, as is known to those of skill in the art, does not typically include a display for Caller ID. When the callee's POTS phone rings and the callee answers, the switch attached to the POTS phone could continue to generate a ringback to the caller while presenting the callee with an IVR menu that prompts the callee to, for example: 1) press "#" accept the call; 2) press "1" to send the caller to voicemail; or 3) press "2" to hear a list of outgoing messages that can be played to the caller. Optionally, the IVR menu prompt could be prefaced with an announcement of the incoming caller's identity, which could be generated using known text-to-speech engines. For example, when the callee picks of the phone, he could hear the prompt "The number 555-5555 is calling you. Press # to accept the call. Press 1 to send the call to voicemail. Press 2 to hear a list of outgoing messages that can be played to the caller." It will now be apparent that other combinations of the foregoing with different types of telephone systems can be made, and that such combinations are within the scope of the invention.

It is also contemplated that different sub-sets of prerecorded outgoing messages could be offered to the callee based on the Caller ID of the incoming call. For example, a certain sub-set of messages could be made available when the callee's spouse calls, while another subset of messages could be made available when the callee's stockbroker calls.

It is also contemplated that the present invention can be used in a variety of applications. For example, the invention can be used to facilitate the answering of responses to newspaper classified advertisements. For example, where the callee has placed a newspaper classified advertisement that offers an apartment for rent, and the apartment has already been rented, then the callee can screen calls, based upon Caller ID, and select a pre-recorded message that tells the caller that the apartment has already been rented to avoid having to answer the telephone.

It is also contemplated that rules can be established by a callee, based upon Caller ID information and/or time and date information for example, so that unknown callers hear a predefined message (such as, "The advertised apartment has been rented. If you still wish to leave a message, please do so after the beep." message mentioned above) while other callers are presented to the callee in the manner described above.

It is also contemplated that, where the callee cannot identify the incoming caller, the callee can be given the opportunity to simply direct the incoming call to a voicemail system, or to an IVR menu that allows the caller to select an appropriate message. Thus, continuing with the newspaper advertisement example, the caller can be queried "If you are calling about the apartment for rent, press 1".

It is further contemplated that the present invention can be used where the callee is expecting callers who speak different languages. Accordingly, messages recorded in different languages can be recorded and saved on storage device 40—the message in the appropriate language being selectable, for example, by the callee based on the callee's knowledge of the caller's desired language.

It is contemplated that the components in system 20 of FIG. 1 can be implemented in a variety of ways. For example, processing unit 36 and storage device 40 can be incorporated directly into a telephony-device associated with the callee, such as a rich-featured telephone having a display, central processing unit, and memory.

It is also contemplated that the actual management and/or selection of the outgoing message can be made from any device, such as a pager, that allows the callee to view the Caller ID of the caller, and to select a desired outgoing message. Such a device need-not be enabled to actually carry a voice telephone call, but can be simply connected to a base station 24 or other switch. Such a device can simply signal or otherwise notify the callee of the existence of an incoming telephone call, and allow the callee to provide criteria that allows processing unit 36 and the callee to assemble an appropriate message to be played for the caller. Where such a device has an alphanumeric keyboard input device, then the callee can actually prepare a text message which can be played to the caller using a text-to-speech generator within processing unit 36.

The present invention can also operate as an enhancement to call waiting features. Specifically, when a callee who has call waiting is on a call and is notified that another incoming call has arrived, the callee can provide a flash signal to base station 24 to place the existing call on hold, in the conventional manner, but then his telephone 28 assumes the above-mentioned limited off-hook condition wherein the callee can assemble a message or answer the second call in the conventional manner, by going to an off-hook condition, as desired.

The present invention provides a novel, system, method and apparatus for answering telephone calls that allows the callee to maintain a degree of privacy while providing a personal response to a number of different callers. While a callee is in meetings, eating a meal or engaged in a personal conversation, the callee can discretely acknowledge the caller's incoming call and send a personal message to the caller. If desired, the callee can also tell the caller when the callee will be available.

The above-described embodiments of the invention are intended to be examples of the present invention and alterations and modifications may be effected thereto, by those of skill in the art, without departing from the scope of the invention which is defined solely by the claims appended hereto.

I claim:

1. A system for responding to an incoming telephone call, comprising:

a switching device for receiving said incoming telephone call from a caller, said switching device operable to selectively transmit a notification of said incoming telephone call over a single communications link and further operable to selectively connect said incoming call over said same single communication link;

a telephony-interface device, operable to receive said notification of said incoming telephone call and to be connected to said incoming telephone call over said same single communication link, said telephony-interface device further operable to gather at least one input value from a callee after receiving said notification and transmit said at least one input value over said same single communication link;

a storage device for storing a plurality of pre-composed messages, each of said plurality of pre-composed messages including at least one argument portion; and a processing unit connected to said storage device and said telephony-interface device via said switching device, said processing unit operable to determine the identity of the caller and assemble an outgoing message based upon said identity of said caller, said outgoing message being a selected one of said plurality of pre-composed messages and where said at least one argument portion is determined by said at least one input value transmitted from said telephony-interface device over said same single communication link.

2. The system of claim 1 wherein the value for said at least one argument portion in said outgoing message comprises a numeric value selected on said telephony-interface device.

3. The system of claim 2, wherein said telephony-interface device generates a reminder signal after a period of time equal to said value of said at least one argument portion.

4. The system of claim 1 wherein said telephony-interface device comprises a keypad.

5. The system of claim 4 wherein the value for said at least one argument portion in said outgoing message comprises a word string wherein said word string is selected from a plurality of possible word strings located on said storage device, where each word string is associated with a possible input value on said telephony-interface device.

6. The system of claim 5, wherein said word string is assembled into said outgoing message using a recorded audio message of said word string.

7. The system of claim 5, wherein said word string is assembled into said outgoing message using a text-to-speech generator.

8. The system of claim 1, wherein said telephony-interface device comprises a mouthpiece and said value for said at least one argument portion is dictated.

9. The system of claim 1, wherein said outgoing message is recorded in a log entry.

10. The system of claim 1, wherein each of said plurality of pre-composed messages has at least two different argument portions, each said argument portion being determined by a respective input value input by a user of said telephony interface device.

11. The system of claim 1, having more than two pre-composed messages and wherein at least a first pre-composed message has at least one different argument portion than at least a second pre-composed message.

12. The system of claim 1 wherein said telephony-interface device after receiving said notification is further operable to gather at least one input value from said callee in response to at least one prompt provided to said callee and transmit said at least one input value over said communication link.

13. The system of claim 12, wherein based upon said identity of said caller a different sub-set of said plurality of pre-composed messages is offered to said callee.

14. The system of claim 1 wherein if said processing unit is unable to determine the identity of said caller, then said processing unit is operable in response to said at least one input value transmitted from said telephony-interface device to selectively prompt said caller to leave a message for said callee.

15. The system of claim 1 wherein:
 each of said plurality of pre-composed messages is stored in at least one language; and
 said processing unit is operable to assemble an outgoing message in a desired language of said caller if said pre-composed message is stored in more than one language.

16. The system of claim 1 wherein the single communications link is a wireless link based on any wireless protocol.

17. The system of claim 16 wherein the wireless protocol is one of TDMA, FDMA, CDMA, and GSM.

18. A processing unit for use in a call-answer system that includes:
 a switching device for receiving an incoming telephone call from a caller, said switching device operable to selectively transmit a notification of the incoming telephone call over a single communications link and further operable to selectively connect the incoming call over the same single communication link;
 a telephony-interface device, operable to receive the notification of the incoming telephone call and to be connected to the incoming telephone call over the same single communication link, said telephony-interface device further operable to gather at least one input value from a callee and transmit the at least one input value over the same single communication link;
 a storage device for storing a plurality of pre-composed messages, each of the plurality of pre-composed messages including at least one argument portion; and
 said processing unit connected to said storage device and said telephony-interface device via said switching device,
 said processing unit operable to determine the identity of the caller and to transmit a notification of said incoming call over a single communications link to a telephony-interface device, including the identity of said caller in said notification, and if a response is received from said telephony-interface device over said same single communications link that indicates that a user of the telephony-interface device wishes to receive said incoming call, then connecting said incoming call to said telephony-interface device over said same single communications link, but otherwise assembling an outgoing message based upon said identity, said outgoing message being selected from a plurality of pre-composed messages and where at least one argument portion of the selected pre-composed message is determined by a user of the said telephony-interface device after receiving said notification of said incoming call.

19. The processing unit of claim 18 wherein the single communications link is a wireless link based on any wireless protocol.

20. The processing unit of claim 19 wherein the wireless protocol is one of TDMA, FDMA, CDMA, and GSM.

21. A method for handling an incoming call in a call-answer system, said method comprising the steps of:
 defining a plurality of pre-composed messages associated with at least one caller identity, each of said plurality of pre-composed messages including at least one argument portion;
 receiving the incoming telephone call from a caller;
 determining the identity of said caller;
 selecting one of said plurality of pre-composed messages based upon the identity of said caller;
 transmitting a notification of said incoming telephone call over a single communications link to a telephony-interface device, including the identity of said caller in said notification; and
 if a response is received from said telephony-interface device over said same single communications link that indicates that a user of the telephony-interface device wishes to receive said incoming call, then connecting said incoming call to said telephony-interface device over said same single communications link, but otherwise assembling an outgoing message from the selected pre-composed message, where a value selected on said telephony-interface is the value for said at least one argument portion and outputting said outgoing message to said caller.

22. The method of claim 21 wherein the value for said at least one argument portion in said outgoing message comprises a numeric value selected on said telephony-interface device.

23. The method of claim 22, wherein said telephony-interface device generates a reminder signal after a period of time equal to said value of said at least one argument portion.

24. The method of claim 21 wherein said telephony-interface device comprises a keypad.

25. The method of claim 24 wherein the value for said at least one argument portion in said outgoing message comprises a word string, wherein said word string is selected from a plurality of possible word strings located on said storage device, where each word string is associated with a potential input value.

26. The method of claim 25, wherein said word string is assembled into said outgoing message using a recorded audio message of said word string.

27. The method of claim 25 wherein said word string is assembled into said outgoing message using a text-to-speech generator.

28. The method of claim 21, wherein said telephony-interface device comprises a mouthpiece.

29. A system for responding to incoming telephone calls, comprising:
 a telephony-interface device for transmitting and receiving data over a single communications link and enabling a user to conduct telephone calls over the same single communications link and to input data for transmission over the same single communications link;

a switching device connected to a telephone network for receiving an incoming telephone call from a caller over the telephone network, selectively transmitting notification of the receipt of the incoming telephone call via the same single communications link to said telephony-interface device, selectively connecting the incoming telephone call to said telephony-interface device via the same single communications link, and selectively transmitting outgoing messages to the caller;

a storage device for storing a plurality of pre-composed messages, each of the pre-composed messages including at least one argument portion; and a processing unit connected to said storage device and to said switching device, said processing unit operable to determine the identity of the caller and to assemble for transmission by said switching device to the caller an outgoing message based upon the identity of the caller, the outgoing message being a selected one of the plurality of pre-composed messages and where the argument portion or portions are determined by data inputted by the user of said telephony-interface device and transmitted from said telephony-interface device to said switching device via the same single communications link.

30. The system of claim 29 wherein the single communications link is a wireless link based on any wireless protocol.

31. The system of claim 30 wherein the wireless protocol is one of TDMA, FDMA, CDMA, and GSM.

32. A system for responding to an incoming telephone call, comprising:

a switching device for receiving said incoming telephone call from a caller, said switching device operable to selectively transmit a notification of said incoming telephone call over a single communications link and further operable to selectively connect said incoming call over said same single communication link;

a telephony-interface device, operable to receive said notification of said incoming telephone call and to be connected to said incoming telephone call over said same single communication link, said telephony-interface device further operable to gather at least one input value from a callee and transmit said at least one input value over said same single communication link;

a storage device for storing a plurality of pre-composed messages, each of said plurality of pre-composed messages including at least one argument portion; and a processing unit connected to said storage device and said telephony-interface device via said switching device, said processing unit operable to determine the identity of the caller and assemble an outgoing message based upon said identity of said caller, said outgoing message being a selected one of said plurality of pre-composed messages and where said at least one argument portion is determined by said at least one input value.

33. The system of claim 32 wherein the single communications link is a wireless link based on any wireless protocol.

34. The system of claim 33 wherein the wireless protocol is one of TDMA, FDMA, CDMA, and GSM.

* * * * *